(12) United States Patent
Salmela et al.

(10) Patent No.: US 11,178,534 B2
(45) Date of Patent: Nov. 16, 2021

(54) MANAGEMENT OF A SUBSCRIBER ENTITY (71) Applicant: Telefonaktiebolaget LM Ericsson (publ), Stockholm (SE)

(72) Inventors: Patrik Salmela, Espoo (FI); Kazi Wali Ullah, Espoo (FI); Abu Shohel Ahmed, Espoo (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/757,600

(22) PCT Filed: Nov. 1, 2017

(86) PCT No.: PCT/EP2017/077953
§ 371 (c)(1),
(2) Date: Apr. 20, 2020

(87) PCT Pub. No.: WO2019/086110
PCT Pub. Date: May 9, 2019

(65) Prior Publication Data
US 2020/0275256 A1  Aug. 27, 2020

(51) Int. Cl.
*H04W 8/20* (2009.01)
*H04W 76/10* (2018.01)
(Continued)

(52) U.S. Cl.
CPC .......... *H04W 8/205* (2013.01); *H04W 12/06* (2013.01); *H04W 12/72* (2021.01); *H04W 60/00* (2013.01); *H04W 76/10* (2018.02)

(58) Field of Classification Search
CPC ......... H04L 63/0869; H04L 9/08; H04L 9/32; H04L 9/3239; H04L 9/3273; H04L 67/30;
(Continued)

(56) References Cited

U.S. PATENT DOCUMENTS

| 2014/0004827 A1* | 1/2014 | O'Leary | H04W 12/35 |
| | | | 455/411 |
| 2016/0050557 A1* | 2/2016 | Park | H04W 8/205 |
| | | | 455/419 |

(Continued)

FOREIGN PATENT DOCUMENTS

| EP | 3024261 A1 | 5/2016 |
| WO | 2016153323 A1 | 9/2016 |

(Continued)

OTHER PUBLICATIONS

Author Unknown, "RSP Technical Specification," Version 2.1, GSM Association (GSMA), Official Document SGP.22, Feb. 27, 2017, 247 pages.
(Continued)

*Primary Examiner* — Erica Navar
(74) *Attorney, Agent, or Firm* — Withrow & Terranova, PLLC (57) ABSTRACT

There is provided mechanisms for enabling management of a subscriber entity. A method is performed by the subscriber entity. The method comprises obtaining a message from a subscription server. The message comprises an event record. The event record is addressed to the subscriber entity and comprises a pointer to a primary entity. The method comprises establishing a connection to the primary entity for management of the subscriber entity.

16 Claims, 6 Drawing Sheets

(51) Int. Cl.
*H04W 12/06* (2021.01)
*H04W 60/00* (2009.01)
*H04W 12/72* (2021.01)

(58) Field of Classification Search
CPC ... H04L 9/0869; H04L 9/3226; H04L 9/3236; H04W 12/0023; H04W 12/06; H04W 12/08; H04W 4/50; H04W 4/60; H04W 8/205; H04W 76/10; H04W 12/00514; H04W 60/00
USPC .................................................. 455/418–420
See application file for complete search history.

(56) References Cited

U.S. PATENT DOCUMENTS

2016/0150400 A1* 5/2016 Cha .................... H04M 1/0266
455/418
2016/0301529 A1* 10/2016 Park ...................... H04L 67/303
2016/0330608 A1* 11/2016 Benn ..................... H04W 12/04
2016/0352698 A1* 12/2016 Long .................. H04L 63/0823
2017/0064552 A1* 3/2017 Park ...................... H04W 8/205
2018/0124595 A1 5/2018 Park et al.

FOREIGN PATENT DOCUMENTS

WO 2017027115 A1 2/2017
WO 2017164500 A1 9/2017

OTHER PUBLICATIONS

International Search Report and Written Opinion for International Patent Application No. PCT/EP2017/077953, dated Jul. 9, 2018, 12 pages.

* cited by examiner

MANAGEMENT OF A SUBSCRIBER ENTITY

This application is a 35 U.S.C. § 371 national phase filing of International Application No. PCT/EP2017/077953, filed Nov. 1, 2017, the disclosure of which is incorporated herein by reference in its entirety.

TECHNICAL FIELD

Embodiments presented herein relate to methods, a subscriber entity, a connector service entity, a computer program, and a computer program product for enabling management of the subscriber entity.

BACKGROUND

Mobile networks are being used to connect all sorts of devices; automated reading of utility meters, intelligent connectivity of cars and commercial vehicles to enable drivers to access navigation, infotainment or breakdown services, traffic lights, home security and assisted living.

A subscriber identity module or subscriber identification module (SIM) is an integrated circuit chip that is intended to securely store the international mobile subscriber identity (IMSI) number and its related key, as well as other information relevant for the subscription, which is used to identify and authenticate subscriptions on the devices. The SIM circuit is part of the function of a Universal Integrated Circuit Card (UICC) physical smart card.

The GSM Association (GSMA), where GSM is short for Global System for Mobile communications, has released a technical specification denoted SGP.22-RSP v2.1, below denoted SGP.22v2.1, defining remote SIM provisioning for consumer devices and a technical specification denoted SGP.02 disclosing a remote provisioning architecture for embedded UICC (eUICC), which targets machine-to-machine (M2M) type communications devices.

In remote SIM provisioning, the operator uses an entity called SM-DP+/SM-DP (where SM-DP is short for Subscription Management—Data Preparation) for creation of SIM profiles, such as universal (U)SIM profiles, that are later installed from the SM-DP/SM-DP+ to the eUICC. For the consumer devices, the profile is installed through a Local Profile Assistant (LPA) on the consumer device to the Issuer Security Domain Profile (ISD-P) on the eUICC in the device. For the M2M devices, the SM-DP installs the profile via a separate (external) entity, SM-SR, to the ISD-P on the device.

Both above mentioned variants have the device owner obtaining a subscription for the device from the operator by providing the operator with relevant information about the device to be provisioned, optionally including eUICC ID (EID) and International Mobile Station Equipment Identity (IMEI). The subscription can be obtained from a point of sales, via a web page of the operator, or other similar methods. Section 3.1 in SGP.22v2.1 describes the profile download initiation process. It shows how the user orders a subscription from the operator, and how the operator asks the SM-DP+ to generate the matching profile. Then the operator provides the user with an activation code (AC) that the user can insert into/provide to the device to be provisioned. The device can extract the relevant information (SM-DP+ reachability information, etc.) from the activation code and then proceed to contact the SM-DP+ for downloading the profile based on the AC after mutual authentication and various security functions.

The documents SGP.22v2.1 and SGP.02 suggest that the device (denoted as a companion device) could be managed through a primary device (e.g. a mobile phone, etc.), which can e.g. provide global connectivity (through e.g. WiFi tethering) to the companion device and act as the input device for entering e.g. the activation code of the companion device. The companion device is then paired with the primary device and the user can use the input and user interface of the primary device to operate the companion device, e.g. to perform local profile management or initiate profile download.

However, if such a primary device is to be used to, at any time, manage the profile(s) of the companion device, the primary device needs to be physically close to the companion device and provide access tethering locally to the companion device to be managed, which might not always be feasible.

The device could be managed through a device management portal, thus without the use of a primary device. This, however, assumes that the device has been registered to the management portal and supports the management protocol used by the management portal for management of the device, which might not always be the case.

Hence, there is still a need for an improved management of devices, and especially subscriber entities of devices.

SUMMARY

An object of embodiments herein is to provide efficient management of subscriber entities.

According to a first aspect there is presented a method for enabling management of a subscriber entity. The method is performed by the subscriber entity. The method comprises obtaining a message from a subscription server. The message comprises an event record. The event record is addressed to the subscriber entity and comprises a pointer to a primary entity. The method comprises establishing a connection to the primary entity for management of the subscriber entity.

According to a second aspect there is presented a subscriber entity for enabling management of the subscriber entity. The subscriber entity comprises processing circuitry. The processing circuitry is configured to cause the subscriber entity to obtain a message from a subscription server. The message comprises an event record. The event record is addressed to the subscriber entity and comprises a pointer to a primary entity. The processing circuitry is configured to cause the subscriber entity to establish a connection to the primary entity for management of the subscriber entity.

According to a third aspect there is presented a subscriber entity for enabling management of the subscriber entity. The subscriber entity comprises an obtain module configured to obtain a message from a subscription server. The message comprises an event record. The event record is addressed to the subscriber entity and comprises a pointer to a primary entity. The subscriber entity comprises an establish module configured to establish a connection to the primary entity for management of the subscriber entity.

According to a fourth aspect there is presented a computer program for enabling management of a subscriber entity. The computer program comprises computer program code which, when run on processing circuitry of the subscriber entity, causes the subscriber entity to perform a method according to the first aspect.

According to a fifth aspect there is presented a method for enabling management of a subscriber entity. The method is performed by a connector service entity. The method comprises receiving a request for a primary entity for management of the subscriber entity. The method comprises generating an event record for the subscriber entity. The event record is addressed to the subscriber entity and comprises a pointer to the primary entity. The method comprises providing a message comprising the event record to a subscription server for delivery of the message to the subscriber entity.

According to a sixth aspect there is presented a connector service entity for enabling management of a subscriber entity. The connector service entity comprises processing circuitry. The processing circuitry is configured to cause the connector service entity to receive a request for a primary entity for management of the subscriber entity. The processing circuitry is configured to cause the connector service entity to generate an event record for the subscriber entity. The event record is addressed to the subscriber entity and comprises a pointer to the primary entity. The processing circuitry is configured to cause the connector service entity to provide a message comprising the event record to a subscription server for delivery of the message to the subscriber entity.

According to a seventh aspect there is presented a connector service entity for enabling management of a subscriber entity. The connector service entity comprises a receive module configured to receive a request for a primary entity for management of the subscriber entity. The connector service entity comprises a generate module configured to generate an event record for the subscriber entity. The event record is addressed to the subscriber entity and comprises a pointer to the primary entity. The connector service entity comprises a provide module configured to provide a message comprising the event record to a subscription server for delivery of the message to the subscriber entity.

According to an eight aspect there is presented a computer program for enabling management of a subscriber entity, the computer program comprising computer program code which, when run on processing circuitry of a connector service entity, causes the connector service entity to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these subscriber entities, these connector service entities, and these computer programs provide efficient management of the subscriber entity.

Advantageously these methods, these subscriber entities, these connector service entities, and these computer programs provide means for remotely managing the subscriber entity.

Advantageously these methods, these subscriber entities, these connector service entities, and these computer programs remove the need for the primary device to be located physically close to the subscriber entity whilst still enabling the primary device for managing the subscriber entity.

Advantageously these methods, these subscriber entities, these connector service entities, and these computer programs remove the need for having a dedicated management server.

It is to be noted that any feature of the first, second, third, fourth, fifth, sixth seventh, eight, and ninth aspects may be applied to any other aspect, wherever appropriate. Likewise, any advantage of the first aspect may equally apply to the second, third, fourth, fifth, sixth, seventh, eight, and/or ninth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
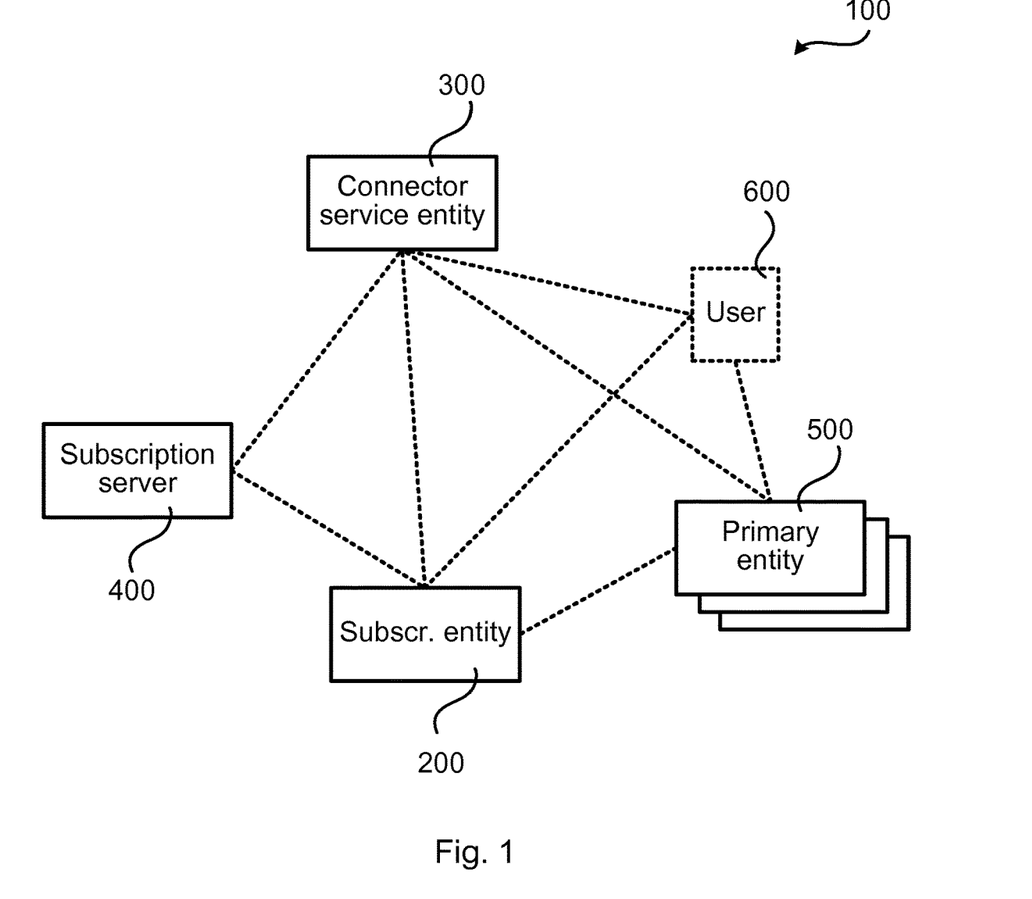
FIG. 1 is a schematic diagram illustrating a communications system according to embodiments.

FIG. 1 is a schematic diagram illustrating a communications system 100 where embodiments presented herein can be applied. The communications system 100 comprises a subscriber entity 200, a connector service entity 300, a subscription server 400, and at least one primary device 500 (hereinafter denoted primary entity).

In some aspects the subscriber entity 200 is an eSIM entity. The subscriber entity 200 generally comprises a profile handling unit, which could be provided as an Issuer Security Domain Root (ISD-R) function, or just ISD-R for short, and a remote subscription handling and storing unit, such as an Embedded Universal Integrated Circuit Card (eUICC). According to some aspects the ISD-R is provided within the eUICC. Functions of an embedded SIM (eSIM, e-SIM, or virtual SIM) circuit could be part of the function of the eUICC. The subscriber entity 200 might be part of a terminal device, being either a consumer device (such as a mobile phone, modem, vessel, vehicle, or drone), or a machine-type communications (MTC) device (such as a sensor, or an Internet of Things device, etc.). The subscriber entity 200 is, via its hosting terminal device, capable of wireless communication.

In some aspects the subscription server 400 is a Subscription Manager Discovery Server (SM-DS). According to SGP.22v2.1, the SM-DS could be used for storing events for an eUICC, and the eUICC could establish an operative connection to the SM-DS to find out if there are any pending events for it. The events in the SM-DS can be identified by an event identity (ID) for a specific EID. The SM-DS might store events for profile download. Each such an event for profile download comprises information of the SM-DP+ and the EID of the target device (subscriber entity 200) as well as the Matching ID (as event ID), which is used for identifying the profile to be downloaded at the SM-DP+.

FIG. 1 further illustrates a user 600 which might interact with the subscriber entity 200, either directly or via the primary entity 500, and with the connector service entity 300, possibly via the same or another primary entity 500.

As disclosed above there is still a need for an improved management of subscriber entities 200.

The embodiments disclosed herein therefore relate to mechanisms for enabling management of a subscriber entity 200. In order to obtain such mechanisms there is provided a subscriber entity 200, a method performed by the subscriber entity 200, a computer program product comprising code, for example in the form of a computer program, that when run on processing circuitry of the subscriber entity 200, causes the subscriber entity 200 to perform the method. In order to obtain such mechanisms there is further provided a connector service entity 300, a method performed by the connector service entity 300, and a computer program product comprising code, for example in the form of a computer program, that when run on processing circuitry of the connector service entity 300, causes the connector service entity 300 to perform the method.

Figure 2:
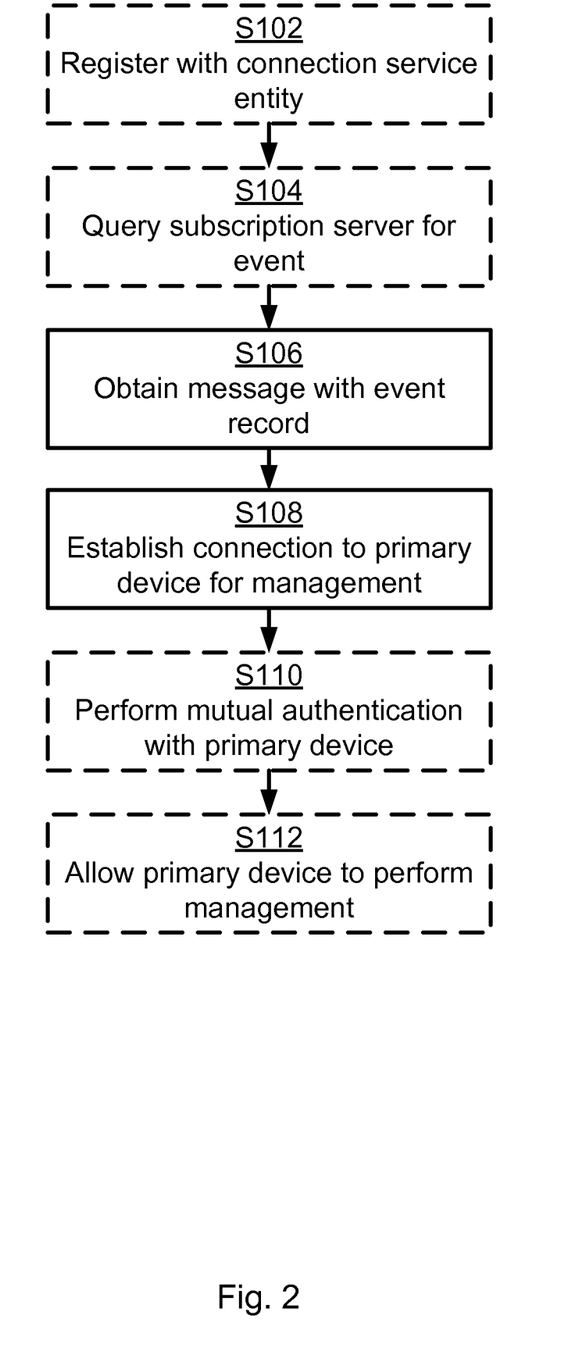
FIGS. 2 and 3 are flowcharts of methods according to embodiments.

Reference is now made to FIG. 2 illustrating a method for enabling management of a subscriber entity 200 as performed by the subscriber entity 200 according to embodiments.

A new event type, that can be published in the SM-DS, is used in order to indicate to the subscriber entity 200 that it should establish a connection to the entity indicated in the event, which entity will act as a primary device for the subscriber entity 200. Hence, the subscriber entity 200 is configured to perform step S106:

S106: The subscriber entity 200 obtains a message from a subscription server 400. The message comprises an event record. The event record is addressed to the subscriber entity 200. The event record comprises a pointer to a primary entity 500. The event record might further have an event ID and/or be of a specific event type.

The subscriber entity 200 could then establish a connection to the indicated primary device in order to allow the remote primary device to manage subscriptions, or other properties, of the subscriber entity 200. Hence, the subscriber entity 200 is configured to perform step S108:

S108: The subscriber entity 200 establishes a connection to the primary entity 500 for management of the subscriber entity 200.

Embodiments relating to further details of enabling management of a subscriber entity 200 as performed by the subscriber entity 200 will now be disclosed.

In some aspects the event record, or part thereof, is signed by the remote primary device. That is, according to an embodiment at least part of the event record is signed by the primary entity 500. However, in other aspects the event record is not signed.

In some aspects the subscriber entity 200 uses the pointer in order to establish the connection to the primary entity 500. In some aspects the pointer provides the subscriber entity 200 with address information (but not identification information) of the primary entity 500. There could be different types of pointers. According to an embodiment the pointer is: an IP address of the primary entity 500, a FQDN of the primary entity 500, or a phone number to the primary entity 500. The phone number can by the subscriber entity 200 be used to transmit a text message to the primary entity 500, where the text message comprises a request for the IP address or FQDN of the primary entity 500, and optionally comprises an identity of the subscriber entity 200. The subscriber entity 200 could alternatively send its IP address to the primary device 500 so that it is the primary device 500 that connects to the subscriber entity 200. In both cases, the text message could optionally comprise the identity of the subscriber entity 200 so that the primary device 500 can map it to a known device/management context.

Further, the event record might comprise and identifier of the indicated remote primary device. That is, according to an embodiment the event record comprises an identifier of the primary entity 500. Such an identifier might then be used by the subscriber entity 200 to determine whether or not to establish the connection to the primary entity 500. The identifier might thereby be used to prevent resource exhaustion attacks by the subscriber entity 200 verifying that the requesting primary entity 500 is actually the one that the subscriber entity 200 trusts to act as its primary device. This could be achieved by the subscriber entity 200 having a whitelist of accepted identifiers.

In some aspects the subscriber entity 200 thus has access to a whitelist of identifiers and is thereby enable to compare the identifier of indicated entity to identifiers stored in the whitelist. That is, according to an embodiment the subscriber entity 200 has access to a list of whitelisted identifiers. The connection is then established only when the identifier of the primary entity 500 is represented in the list of whitelisted identifiers. In further aspects, the subscriber entity 200 might be configured to first check if the identifier is on the whitelist, and then also verify that (if assumed to be signed) the event is duly signed by the identified primary entity 500. In this respect, the identity might be a public key (or a public key certificate), and there is thus a whitelist of public keys, where the public key can be used for verifying the signature of the event.

There could be different types of identifiers of the remote primary device. According to an embodiment the identifier is a cryptographic identifier of the primary entity 500. In further detail, the identifier might be the public key (or a representation of the public key, such as a hash of the public key or a pointer to the public key as stored somewhere else in the network) when using raw public keys (RPK) or the public key certificate of the primary entity 500; in the latter case the identifier might be certificate itself. It might, alternatively, be any other identifier, such as an e-mail address, phone number or username, possibly combined with some credential (such as a password or shared secret) that the owner of the identifier has and that can be used for proving that the owner owns the identifier. This latter identifier would be a symmetric key, whereas the public key identity would have an asymmetric private key for proving ownership of the identity. The credential, i.e. private key or password, might be used for creating the signature with which at least part of the event record might be signed.

Credentials might be used in such a way that the subscriber entity 200 trusts only certain credentials or events signed by a certain entity/credential. In some aspects the subscriber entity 200 therefore not only compares the identifier of the indicated entity to identifiers stored in the whitelist but also verifies credentials of the primary entity 500. In more detail, verification of the identifier might be performed by verifying that the event (or part of it) is signed by a whitelisted identifier. Alternatively, the access control could also be done at the network level.

From a user perspective a requirement could be that the primary device 500 is authenticated before it issues management commands for the subscriber entity's 200. In some aspects the subscriber entity 200 thus only allows the primary entity 500 to manage the subscriber entity 200 after mutual authentication. Hence, according to an embodiment the subscriber entity 200 is configured to perform (optional) steps S110 and S112: S110: The subscriber entity 200 performs mutual authentication with the primary entity 500.

S112: The subscriber entity 200 allows the primary entity 500 to perform management of the subscriber entity 200 only after successful mutual authentication.

However, in other aspects the subscriber entity 200 allows the primary entity 500 to perform management of the subscriber entity 200 even without any mutual authentication with the primary entity 500.

As noted above, there could be different examples of management that the primary entity 500 is allowed to perform. According to an embodiment 8 the management pertains to at least one of: management of a network subscription of the subscriber entity 200, and management of device configurations of the subscriber entity 200. Examples of device configuration include, but are not limited to, specifications as to how often to enter sleep mode, which server or servers the subscriber entity 200 is to connect to and/or send data to, credentials to be used for accessing the server or servers, etc.

There could be different triggers for the subscriber entity 200 to obtain the message from the subscription server 400 in step S106.

In some aspects the event message is received after the subscriber entity 200 querying the subscription server 400 for events. That is, according to an embodiment the subscriber entity 200 is configured to perform (optional) step S104:

S104: The subscriber entity 200 queries the subscription server 400 for events. The message in step S106 is then obtained in response thereto (i.e., in response to the subscriber entity 200 querying the subscription server 400).

There could be different factors determining as to when, and/or how often the subscriber entity 200 should query the subscription server 400 for events. In some aspects the subscriber entity 200 queries the subscription server 400 upon power-up or upon, during operation, obtaining any other indication of a new event being available for the subscriber entity 200. In another aspect, the subscriber entity 200 might subscribe to events from the subscription server 400 and thereby obtain the message with the event record as in step S106. Particularly, according to an embodiment the querying is performed upon power-up of the subscriber entity 200. According to another embodiment the querying is performed upon the subscriber entity 200 obtaining an indication to query the subscription server 400 for events.

In some aspects the subscriber entity 200 is only allowed to obtain events, or at least certain types of events such as events pertaining management, after having securely registered with the connector service entity 300. Therefore, according to an embodiment the subscriber entity 200 is configured to perform (optional) step S102:

S102: The subscriber entity 200 registers with the connector service entity 300 before obtaining the message (as in step S106). The registering comprises pairing the subscriber entity 200 with the connector service entity 300. In some aspects the pairing comprises proving ownership of the subscriber entity 200.

Figure 3:
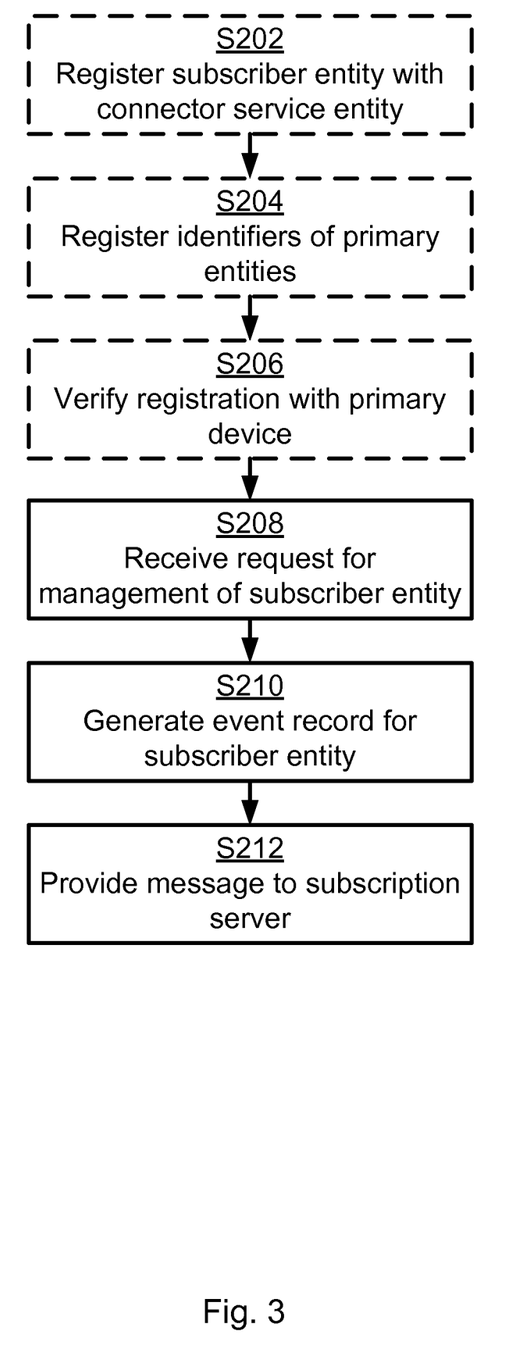

Reference is now made to FIG. 3 illustrating a method for enabling management of a subscriber entity 200 as performed by the connector service entity 300 according to an embodiment.

It is assumed that the primary entity 500, or the primary entity 500 on behalf of the user 600, or the user 600 itself requests to manage the subscriber entity 200. Therefore, the connector service entity 300 is configured to perform step S208:

S208: The connector service entity 300 receives a request for the primary entity 500 for management of the subscriber entity 200.

In response thereto (i.e., in response to having received the request in step S208) the connector service entity 300 generates a corresponding event record. Particularly, the connector service entity 300 is configured to perform step S210:

S210: The connector service entity 300 generates an event record for the subscriber entity 200. The event record is addressed to the subscriber entity 200. The event record comprises a pointer to the primary entity 500.

The event record is then provided to the subscription server 400 for delivery to the subscriber entity 200. Thus, the connector service entity 300 is configured to perform step S212:

S212: The connector service entity 300 provides a message comprising the event record to a subscription server 400 for delivery of the message to the subscriber entity 200.

Embodiments relating to further details of enabling management of a subscriber entity 200 as performed by the connector service entity 300 will now be disclosed.

There could be different ways for the connector service entity 300 to receive the request in step S208. As disclosed above, in some aspects the request is received from the primary entity 500, or from the primary entity 500 on behalf of the user 600, or from the user 600 itself. In the latter case it might be assumed that the connector service entity 300 comprises a user interface through which the connector service entity 300 is enabled to interact with the user 600 and thus receive the request from the user. Alternatively, the request might be received from the user 600 via another device, node, or entity, preferably a device, node, or entity having a trust relation with the connector service entity 300.

As disclosed above, in some aspects the subscriber entity 200 registers with the connector service entity 300. Therefore, according to an embodiment the connector service entity 300 is configured to perform (optional) step S202:

S202: The connector service entity 300 registers the subscriber entity 200 with the connector service entity 300. The registering comprises pairing the subscriber entity 200 with the connector service entity 300. In some aspects the pairing comprises verifying ownership of the subscriber entity 200.

In some aspects the connector service entity 300 registers identities of all devices allowed to become remote primary devices for the subscriber entity 200. That is, according to an embodiment the connector service entity 300 is configured to perform (optional) step S204:

S204: The connector service entity 300 registers identifiers of all primary entities 500 allowed to perform management of the subscriber entity 200.

Examples of identifiers of the primary entities 500 have been disclosed to above. Thus according to an embodiment each of the identifiers is a cryptographic identifier of a respective one of the primary entities 500.

According to an embodiment the identifiers are stored as a list of whitelisted identifiers. Event records are then registered only for those primary entities 500 having a whitelisted identifier.

In some aspects the connector service entity 300 verifies that the primary entity 500 is registered as an authorized remote primary device of the subscriber entity 200. Particularly, according to an embodiment the connector service entity 300 is configured to perform (optional) step S206:

S206: The connector service entity 300 verifies registration of the primary entity 500 with the connector service entity 300. The message is provided (as in step S212) only after the connector service entity 300 has performed the verification. In this respect, in addition to the primary entity 500 being registered at the connector service entity 300 as such, the primary entity 500 is registered as primary device for the specific target subscriber entity 200.

Figure 4:
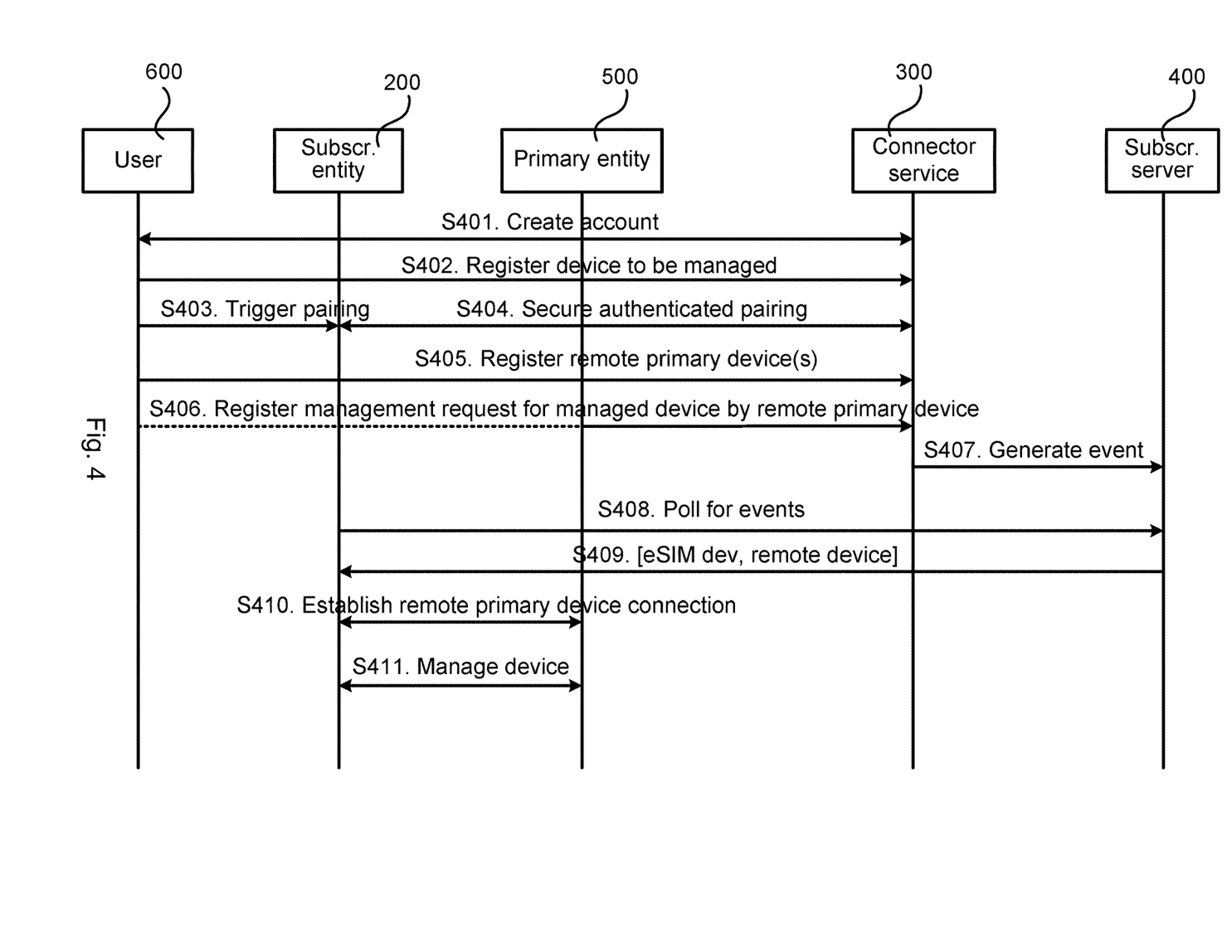
FIGS. 4, 5, and 6 are signalling diagrams according to embodiments.

One particular embodiment for enabling management of a subscriber entity 200 based on at least some of the above disclosed embodiments will now be disclosed in detail with reference to the signalling diagram of FIG. 4.

S401: The user 600, as representing the owner of the subscriber entity 200, creates an account at the connector service entity 300.

S402: The user 600 registers the subscriber entity 200 at the connector service entity 300 and optionally registers the identities, typically the certificates, of all devices that are allowed to become remote primary devices for the for the subscriber entity 200 (i.e. which primary entities 500 that are allowed to manage the subscriber entity 200). A whitelist of such identities might be created at the connector service entity 300. Alternatively, the identities of all devices that are allowed to become remote primary devices for the for the subscriber entity 200 are registered in step S405.

S403, S404: The subscriber entity 200 to be managed is registered with the connector service entity 300. Registering the subscriber entity 200 to be managed with the connector service entity 300 might comprise proving ownership of the subscriber entity 200, e.g. by performing a secure/authenticated pairing between the subscriber entity 200 and the connector service entity. The user 600 might thus trigger the subscriber entity 200 to perform the pairing (S403) where after the subscriber entity 200 performs the pairing (S404).

S405: The primary entity 500 is registered with the connector service entity 300 for the primary entity 500 to become a remote primary device for subscriber entity 200, if this registration has not already been performed in step S402.

S406: The primary entity 500, either by itself or by means of the user 600, is requested to be a primary remote device for the subscriber entity 200. This is requested via the connector service entity 300 by providing the identity of the subscriber entity 200 to be managed and, optionally, authenticating the primary entity 500 to the connector service entity 300 (for example, in case the primary entity 500 itself requests to manage the subscriber entity 200). The connector service entity 300 verifies that the authenticated identity is indeed registered as an authorized remote primary device of the subscriber entity 200. In further aspects, the primary entity 500 might be requested to sign data that will be part of the event record sent in step S407.

S407: The connector service 300 requests to create an event record at the subscription server 400 for the subscriber entity 200, where the event record indicates to the subscriber entity 200 to connect to the primary entity 500.

S408: The subscriber entity 200 queries the subscription server 400 for events either if it has an event ID that it wants to get or by the user 600 initiating it via a user interface of the subscription server 400 or as part of the power-up sequence of the subscription server 400.

S409: The subscriber entity 200 obtains an event record from the subscription server 400. The event record indicates to the subscriber entity 200 to connect to the primary entity 500.

S410: The subscriber entity 200 establishes a connection to the indicated primary entity 500 once it trusts the primary entity 500, either via own access control/identity verification or by trusting that the connector service entity 300 handles the authorization verification. The subscriber entity 200 and the primary entity 500 perform mutual authentication using their respective EIDs/certificate to authenticate each other.

S411: The primary entity 500 is by the subscriber entity 200 allowed access to the subscriber entity 200 for management of the subscriber entity 200.

Figure 5:
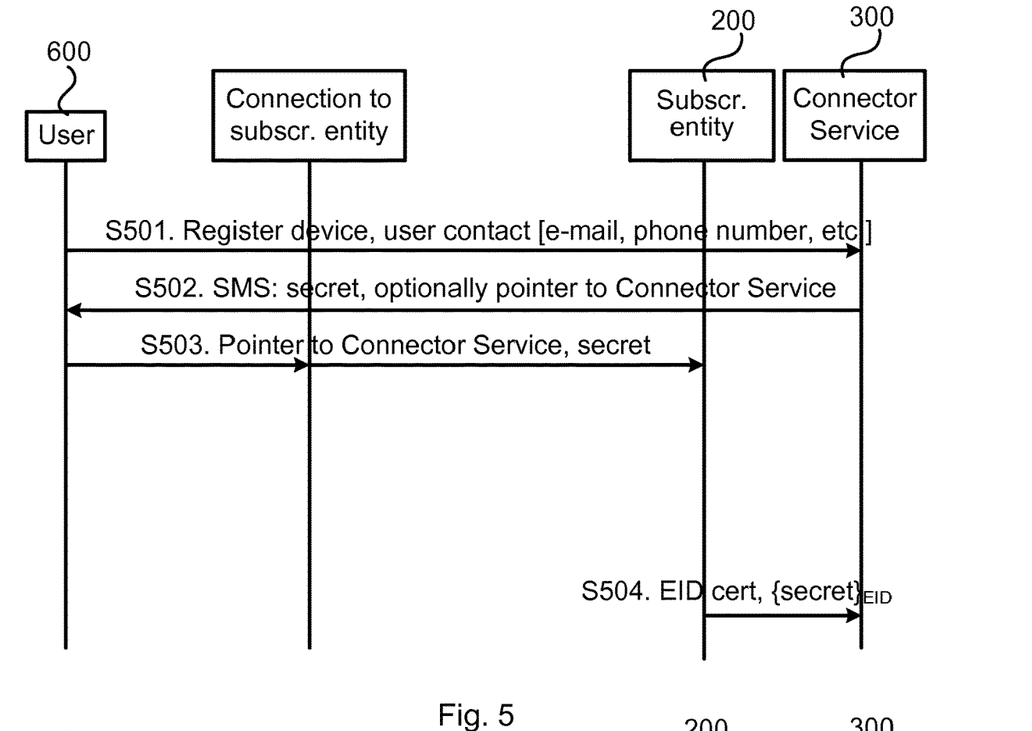

A first particular embodiment for registration of the subscriber entity 200 at the connector service entity 300 based on at least some of the above disclosed embodiments will now be disclosed in detail with reference to the signalling diagram of FIG. 5.

In the embodiment of FIG. 5 it is assumed that the subscriber entity 200 is without its own user interface.

S501: The user 600, as representing the owner of the subscriber entity 200, creates an account at the connector service entity 300. The user 600 indicates that the subscriber entity 200 is to be registered. This communication could be performed from any user device, e.g. a laptop or a smartphone. The communication could be secured e.g. with protocols such as Transport Layer Security (TLS) or Hyper Text Transfer Protocol Secure (HTTPS). The user 600 provides contact information, such as an e-mail address, phone number, electronic identification, etc. of the user 600 such that the user identity can be verified by the connector service entity 300.

S502: The connector service entity 300 sends a secret, e.g. a personal identification number (PIN), a random number, or nonce, to the user 600, where the secret is sent based on the contact information provided, preferably using encrypted communications. As an example, the secret might be sent with a text message (using a Short Message Service (SMS) to the user 600. Optionally the connector service entity 300 provides to the user 600 a pointer to the connector service entity 300 together with the secret.

S503: The user 600 provides a pointer and secret to the subscriber entity 200, preferably using encrypted communications.

S504: The subscriber entity 200 uses the pointer in order to provide the secret to the connector service entity 300, preferably using encrypted communications, where the secret is signed by the subscriber entity 200 and provided together with the EID certificate of the subscriber entity 200. The signed secret is thus used by the subscriber entity 200 to identify/authenticate itself so that the connector service entity 300 is able link the subscriber entity 200 to the account of the user 600. The subscriber entity 200 provides its eUICC/EID certificate, and uses it for signing the secret sent to the connector service entity 300. In this way the connector service 300 is able to authenticate the subscriber entity 200, or at least its EID, based on the signature and register the identity/certificate of the subscriber entity 200. The connector service entity 300 is thereby able to verify that the user 600 is the true owner of the subscriber entity 200.

Figure 6:
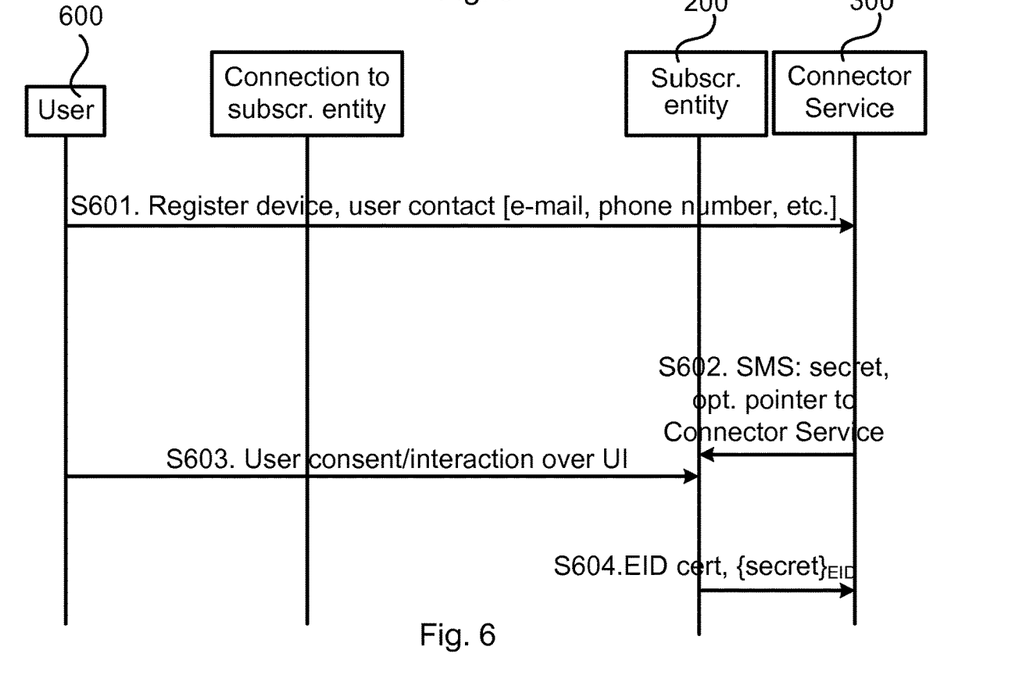

A second particular embodiment for registration of the subscriber entity 200 at the connector service entity 300 based on at least some of the above disclosed embodiments will now be disclosed in detail with reference to the signalling diagram of FIG. 6.

In the embodiment of FIG. 6 it is assumed that the subscriber entity 200 comprises its own user interface that thus can be used for directly interacting with the subscriber entity 200.

S601: The user 600, as representing the owner of the subscriber entity 200, creates an account at the connector service entity 300. The user 600 indicates that the subscriber entity 200 is to be registered. This communication could be performed from any user device, e.g. a laptop or a smartphone. The communication could be secured e.g. with protocols such as TLS or HTTPS. The user 600 provides contact information, such as an e-mail address, phone number etc. of the user 600.

S602: The connector service entity 300 sends a secret, e.g. a personal identification number (PIN), a random number, or nonce, to the subscriber entity 200 using the information provided by the user 600 in step 601. Optionally the connector service entity 300 provides to the subscriber entity 200 a pointer to the connector service entity 300.

S603: The user 600 interacts with the subscriber entity 200, preferably using a user interface of the subscriber entity 200, for the subscriber entity 200 to, preferably using secured communications, connect to the connector service entity 300. If the pointer to the connector service was not provided in step S602, the user 600 provides, to the subscriber entity 200, the pointer. Step S603 might be optional, but could be used to establish user consent for the subscriber entity 200 to register at the connector service entity 300.

S604: The subscriber entity 200 uses the pointer in order to know to what entity to provide the secret, thus to provide the secret to the connector service entity 300, preferably using encrypted communications, where the secret is signed by the subscriber entity 200 and provided together with the EID and the certificate of the subscriber entity 200. The secret is thus used by the subscriber entity 200 to identify/authenticate itself so that the connector service entity 300 is able link the subscriber entity 200 to the account of the user 600. The subscriber entity 200 provides its eUICC/EID certificate, and uses it for signing the secret sent to the connector service entity 300. In this way the connector service 300 is able to authenticate the subscriber entity 200, or at least its EID, based on the signature and register the identity/certificate of the subscriber entity 200. The connector service entity 300 is thereby able to verify that the user 600 is the true owner of the subscriber entity 200.

There could be other ways for the subscriber entity 200 to register with the connector service entity 300.

For example, the subscriber entity 200 might possess a code/secret that can be used for proving ownership by providing the code/secret to the connector service entity 300. The connector service entity 300 might then verify the code/secret together with the identity of the subscriber entity 200 with information provided from the manufacturer of the subscriber entity 200.

For example, the subscriber entity 200 might be registered with the connector service entity 300 at a point of sales or mobile network operator of the connector service entity 300.

Figure 7:
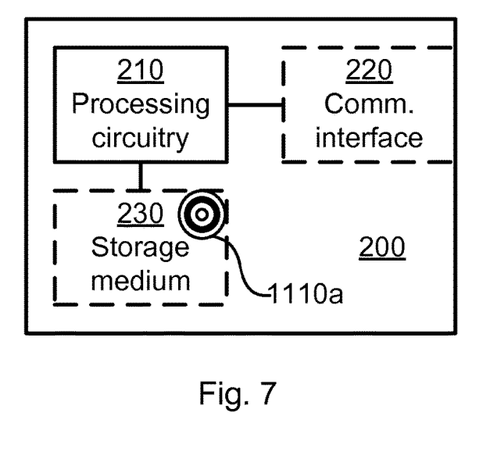
FIG. 7 is a schematic diagram showing functional units of a subscriber entity according to an embodiment.

FIG. 7 schematically illustrates, in terms of a number of functional units, the components of a subscriber entity 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110a (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the subscriber entity 200 to perform a set of operations, or steps, S102-S112, as disclosed above. For example, the storage medium 230 may store the set of operations, and the processing circuitry 210 may be configured to retrieve the set of operations from the storage medium 230 to cause the subscriber entity 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The subscriber entity 200 may further comprise a communications interface 220 for communications with other entities, functions, nodes, and devices, for example as illustrated in FIG. 1. As such the communications interface 220 may comprise one or more transmitters and receivers, comprising analogue and digital components.

The processing circuitry 210 controls the general operation of the subscriber entity 200 e.g. by sending data and control signals to the communications interface 220 and the storage medium 230, by receiving data and reports from the communications interface 220, and by retrieving data and instructions from the storage medium 230. Other components, as well as the related functionality, of the subscriber entity 200 are omitted in order not to obscure the concepts presented herein.

Figure 8:
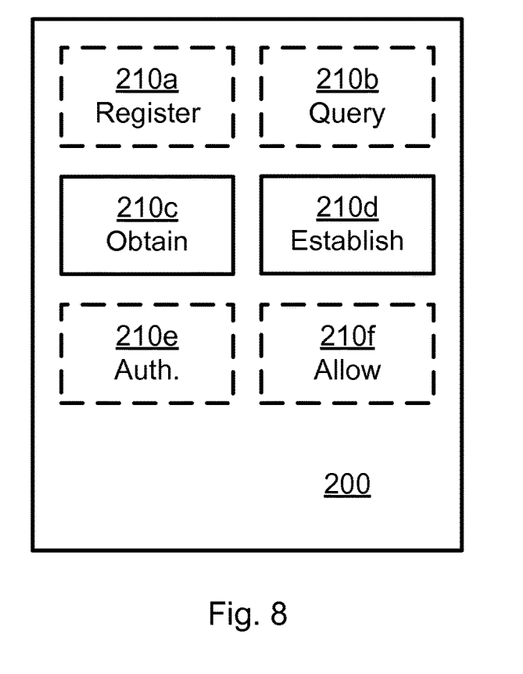
FIG. 8 is a schematic diagram showing functional modules of a subscriber entity according to an embodiment.

FIG. 8 schematically illustrates, in terms of a number of functional modules, the components of a subscriber entity 200 according to an embodiment. The subscriber entity 200 of FIG. 8 comprises a number of functional modules; an obtain module 210c configured to perform step S106 and an establish module 210d configured to perform step S108. The subscriber entity 200 of FIG. 8 may further comprise a number of optional functional modules, such as any of a register module 210a configured to perform step S102, a query module 210b configured to perform step S104, an authentication module 210e configured to perform step S110, and an allow module 210f configured to perform step S112. In general terms, each functional module 210a-210f may be implemented in hardware or in software. Preferably, one or more or all functional modules 210a-210f may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210f and to execute these instructions, thereby performing any steps of the subscriber entity 200 as disclosed herein.

The subscriber entity 200 may be provided as a standalone device or as a part of at least one further device. For example, as disclosed above, the subscriber entity 200 might be an eSIM. As further disclosed above, the subscriber entity 200 might be part of a terminal device, being either a consumer device (such as a mobile phone, modem, vessel, vehicle, or drone), or a machine-type communications (MTC) device (such as a sensor, or an Internet of Things device, etc.). Although a single processing circuitry 210 is illustrated in FIG. 7 the processing circuitry 210 may be distributed among a plurality of devices, or nodes. The same applies to the functional modules 210$a$-210$f$ of FIG. 8 and the computer program 1120$a$ of FIG. 11 (see below).

Figures 9, 10:
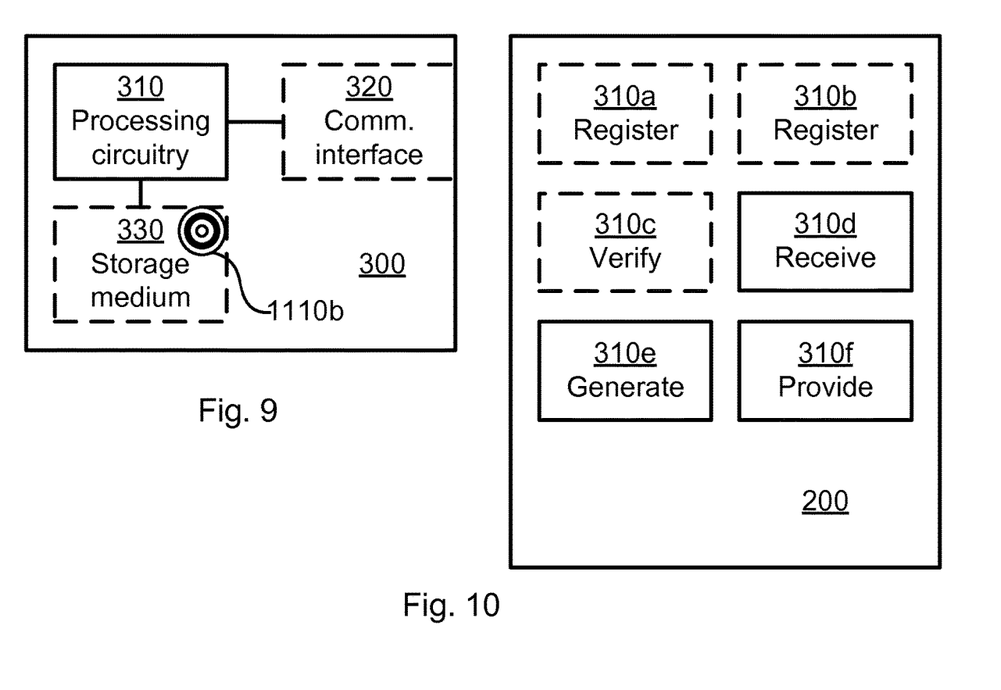
FIG. 9 is a schematic diagram showing functional units of a connector service entity according to an embodiment.
FIG. 10 is a schematic diagram showing functional modules of a connector service entity according to an embodiment.

FIG. 9 schematically illustrates, in terms of a number of functional units, the components of a connector service entity 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product mob (as in FIG. 11), e.g. in the form of a storage medium 330. The processing circuitry 310 may further be provided as at least one application specific integrated circuit (ASIC), or field programmable gate array (FPGA).

Particularly, the processing circuitry 310 is configured to cause the connector service entity 300 to perform a set of operations, or steps, S202-S212, as disclosed above. For example, the storage medium 330 may store the set of operations, and the processing circuitry 310 may be configured to retrieve the set of operations from the storage medium 330 to cause the connector service entity 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The connector service entity 300 may further comprise a communications interface 320 for communications with entities, functions, nodes, and devices, for example as illustrated in FIG. 1. As such the communications interface 320 may comprise one or more transmitters and receivers, comprising analogue and digital components.

The processing circuitry 310 controls the general operation of the connector service entity 300 e.g. by sending data and control signals to the communications interface 320 and the storage medium 330, by receiving data and reports from the communications interface 320, and by retrieving data and instructions from the storage medium 330. Other components, as well as the related functionality, of the connector service entity 300 are omitted in order not to obscure the concepts presented herein.

FIG. 10 schematically illustrates, in terms of a number of functional modules, the components of a connector service entity 300 according to an embodiment. The connector service entity 300 of FIG. 10 comprises a number of functional modules; a receive module 310$d$ configured to perform step S208, a generate module 310$e$ configured to perform step S210, and a provide module 310$f$ configured to perform step S212. The connector service entity 300 of FIG. 10 may further comprise a number of optional functional modules, such as any of a register module 310$a$ configured to perform step S202, a register module 310$b$ configured to perform step S204, and a verify module 310$c$ configured to perform step S206. In general terms, each functional module 310$a$-310$f$ may be implemented in hardware or in software. Preferably, one or more or all functional modules 310$a$-310$f$ may be implemented by the processing circuitry 310, possibly in cooperation with the communications interface 320 and/or the storage medium 330. The processing circuitry 310 may thus be arranged to from the storage medium 330 fetch instructions as provided by a functional module 310$a$-310$f$ and to execute these instructions, thereby performing any steps of the connector service entity 300 as disclosed herein.

The connector service entity 300 may be provided as a standalone device or as a part of at least one further device. Further, a first portion of the instructions performed by the connector service entity 300 may be executed in a first device, and a second portion of the of the instructions performed by the connector service entity 300 may be executed in a second device; the herein disclosed embodiments are not limited to any particular number of devices on which the instructions performed by the connector service entity 300 may be executed. Hence, the methods according to the herein disclosed embodiments are suitable to be performed by a connector service entity 300 residing in a cloud computational environment. Therefore, although a single processing circuitry 310 is illustrated in FIG. 9 the processing circuitry 310 may be distributed among a plurality of devices, or nodes. The same applies to the functional modules 310$a$-310$f$ of FIG. 10 and the computer program 1120$b$ of FIG. 11 (see below).

Figure 11:
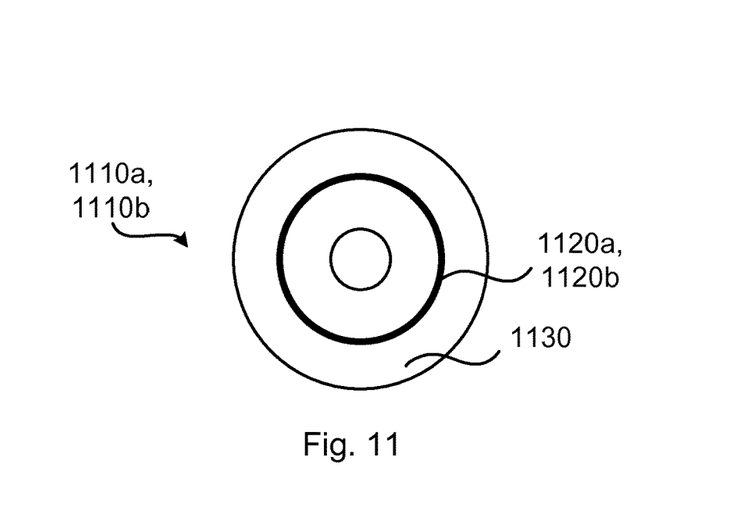
FIG. 11 shows one example of a computer program product comprising computer readable means according to an embodiment.

FIG. 11 shows one example of a computer program product 1110$a$, 1110$b$ comprising computer readable means 1130. On this computer readable means 1130, a computer program 1120$a$ can be stored, which computer program 1120$a$ can cause the processing circuitry 210 and thereto operatively coupled entities and devices, such as the communications interface 220 and the storage medium 230, to execute methods according to embodiments described herein. The computer program 1120$a$ and/or computer program product 1110$a$ may thus provide means for performing any steps of the subscriber entity 200 as herein disclosed. On this computer readable means 1130, a computer program 1120$b$ can be stored, which computer program 1120$b$ can cause the processing circuitry 310 and thereto operatively coupled entities and devices, such as the communications interface 320 and the storage medium 330, to execute methods according to embodiments described herein. The computer program 1120$b$ and/or computer program product 1110$b$ may thus provide means for performing any steps of the connector service entity 300 as herein disclosed.

In the example of FIG. 11, the computer program product 1110$a$, 1110$b$ is illustrated as an optical disc, such as a CD (compact disc) or a DVD (digital versatile disc) or a Blu-Ray disc. The computer program product 1110$a$, 1110$b$ could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120$a$, 1120$b$ is here schematically shown as a track on the depicted optical disk, the computer program 1120$a$, 1120$b$ can be stored in any way which is suitable for the computer program product 1110$a$, 1110$b$.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for enabling management of a subscriber entity, the method being performed by the subscriber entity, the method comprising:
   obtaining a message from a subscription server, the message comprising an event record, the event record being addressed to the subscriber entity and comprising a pointer to a primary entity, wherein the event record comprises a cryptographic identifier of the primary entity; and
   establishing a remote connection to the primary entity for management of the subscriber entity.

2. The method according to claim 1, wherein at least part of the event record is signed by the primary entity.

3. The method according to claim 1, wherein the pointer is an IP address of the primary entity, a fully qualified domain name FQDN of the primary entity, or a phone number to the primary entity.

4. The method according to claim 1, wherein the subscriber entity has access to a list of whitelisted identifiers, and wherein the remote connection is established only when the identifier of the primary entity is represented in the list of whitelisted identifiers.

5. The method according to claim 1, further comprising:
   performing mutual authentication with the primary entity; and
   allowing the primary entity to perform management of the subscriber entity only after successful mutual authentication.

6. The method according to claim 1, wherein the management pertains to at least one of: management of a network subscription of the subscriber entity, and management of device configurations of the subscriber entity.

7. The method according to claim 1, further comprising:
   querying the subscription server for events; and wherein the message is obtained in response thereto.

8. The method according to claim 7, wherein the querying is performed upon power-up of the subscriber entity or upon the subscriber entity obtaining an indication to query the subscription server for events.

9. The method according to claim 1, further comprising:
   registering with a connector service entity before obtaining the message, the registering comprising pairing the subscriber entity with the connector service entity.

10. The method according to claim 1, wherein the subscriber entity is an embedded subscriber identity module eSIM.

11. A method for enabling management of a subscriber entity, the method being performed by a connector service entity, the method comprising:
   registering identifiers of all primary entities allowed to perform management of the subscriber entity, wherein each of the identifiers is a cryptographic identifier of a respective one of the primary entities;
   receiving a request for a primary entity for management of the subscriber entity;
   generating an event record for the subscriber entity, the event record being addressed to the subscriber entity and comprising a pointer to the primary entity; and
   providing a message comprising the event record to a subscription server for delivery of the message to the subscriber entity.

12. The method according to claim 11, further comprising:
   registering the subscriber entity with the connector service entity, the registering comprising pairing the subscriber entity with the connector service entity.

13. The method according to claim 11, wherein the identifiers are stored as a list of whitelisted identifiers, and wherein event records are registered only for those primary entities having a whitelisted identifier.

14. The method according to claim 11, further comprising:
   verifying registration of the primary entity with the connector service entity; and wherein the message is provided only after the connector service entity has performed the verifying.

15. A subscriber entity for enabling management of the subscriber entity, the subscriber entity comprising processing circuitry, the processing circuitry being configured to cause the subscriber entity to:
   obtain a message from a subscription server, the message comprising an event record, the event record being addressed to the subscriber entity and comprising a pointer to a primary entity; and
   establish a remote connection to the primary entity for management of the subscriber entity.

16. A connector service entity for enabling management of a subscriber entity, the connector service entity comprising processing circuitry, the processing circuitry being configured to cause the connector service entity to:
   register identifiers of all primary entities allowed to perform management of the subscriber entity, wherein each of the identifiers is a cryptographic identifier of a respective one of the primary entities;
   receive a request for a primary entity for management of the subscriber entity;
   generate an event record for the subscriber entity, the event record being addressed to the subscriber entity and comprising a pointer to the primary entity; and
   provide a message comprising the event record to a subscription server for delivery of the message to the subscriber entity.

* * * * *